United States Patent

[11] 3,591,241

| [72] | Inventor | Dillis V. Allen<br>208 Euclid Ave., Arlington Heights, Ill. 60004 |
|---|---|---|
| [21] | Appl. No. | 743,213 |
| [22] | Filed | July 8, 1968 |
| [45] | Patented | July 6, 1971 |

[54] HELICAL DRIVE
19 Claims, 16 Drawing Figs.

[52] U.S. Cl. .................................................. 305/8,
104/147, 180/7, 295/8.5, 301/5, 295/32
[51] Int. Cl. .................................................. B61f 11/00
[50] Field of Search .......................................... 301/5 PR;
305/1, 8; 295/8.5, 32; 180/7, 7 A, 3.1

[56] References Cited
UNITED STATES PATENTS

| 795,620 | 7/1905 | Jones | 301/5 (PR) |
| 1,305,535 | 6/1919 | Grabowiecki | 301/5 (PR) |
| 2,898,826 | 8/1959 | Livermont | 180/7 X |
| 3,169,596 | 2/1965 | Wright | 180/7 |
| 3,418,960 | 12/1968 | Nelson | 115/1 |

Primary Examiner—Donald F. Norton

ABSTRACT: A vehicular drive in which the ground-engaging devices take the form of a plurality of roadway-engaging rollers arranged in a helical path around an axis parallel to the direction of movement of the vehicle, with control means for shifting the position of the rollers into any desired helical path to effect an infinitely variable transmission ratio.

PATENTED JUL 6 1971 3,591,241

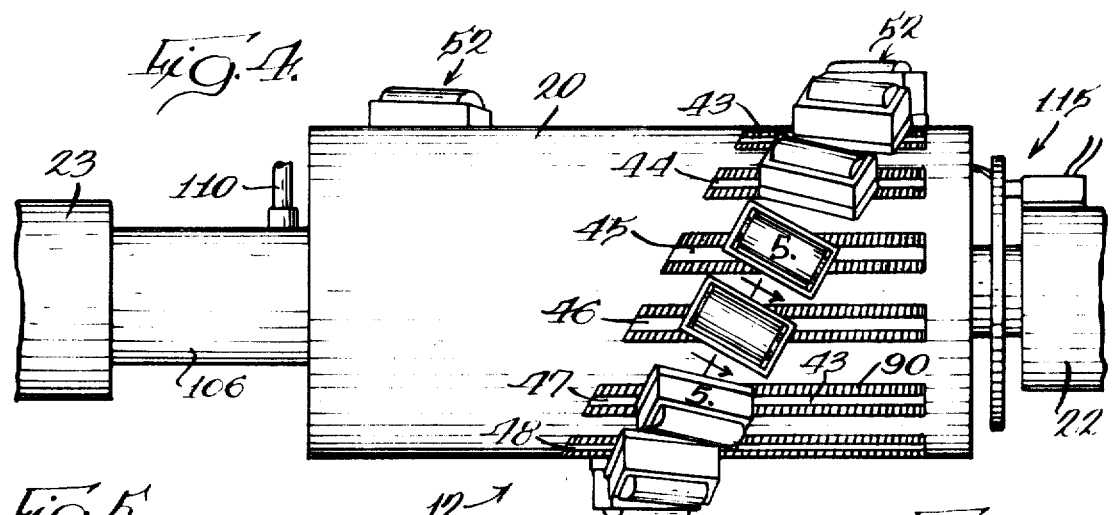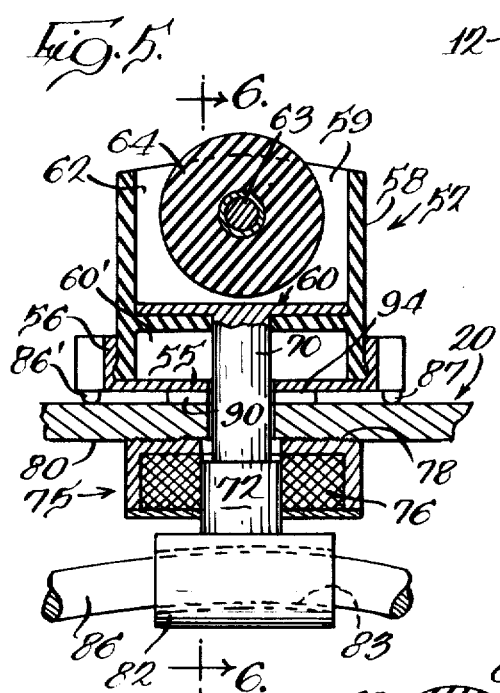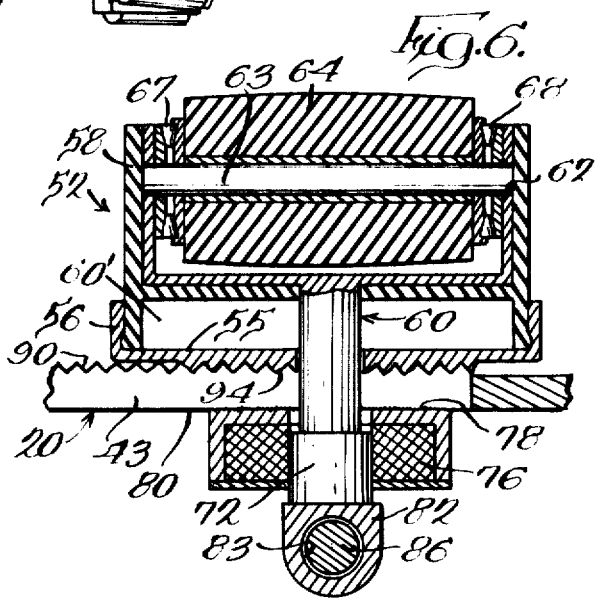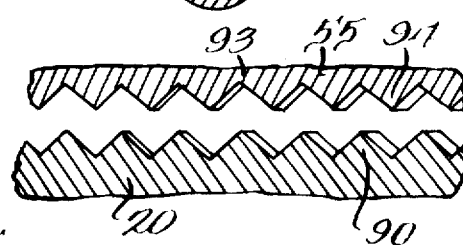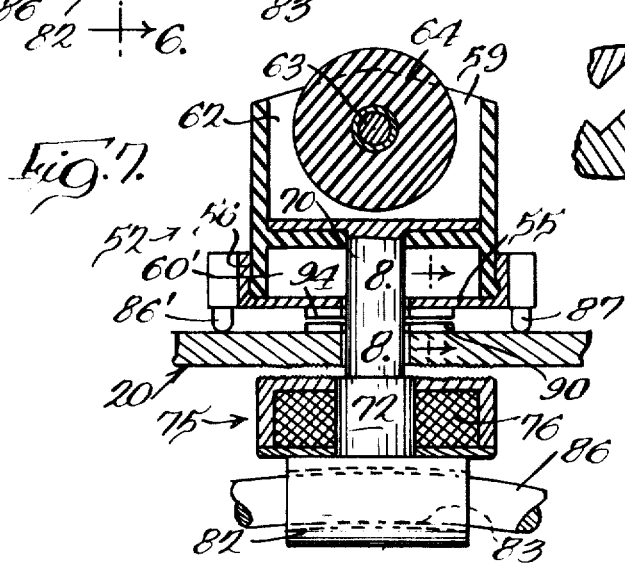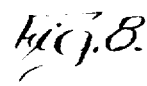

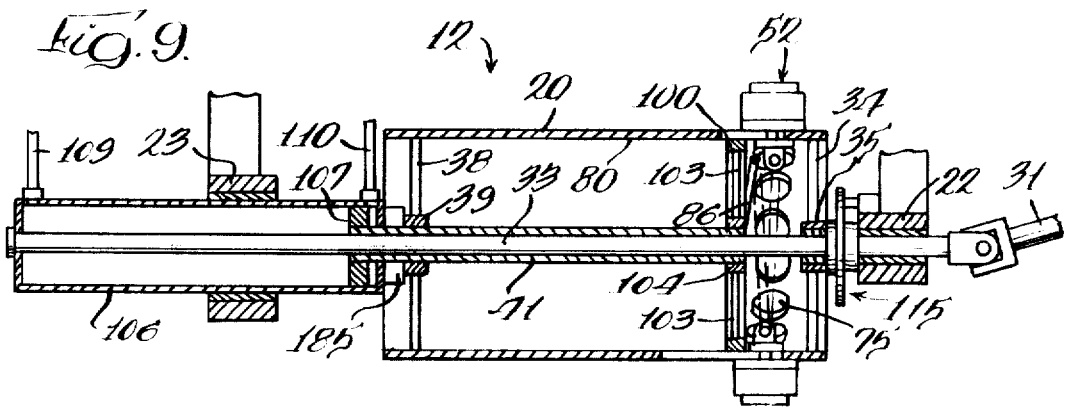
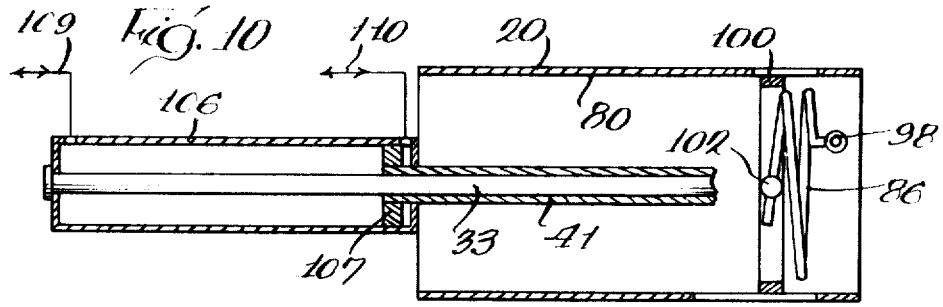
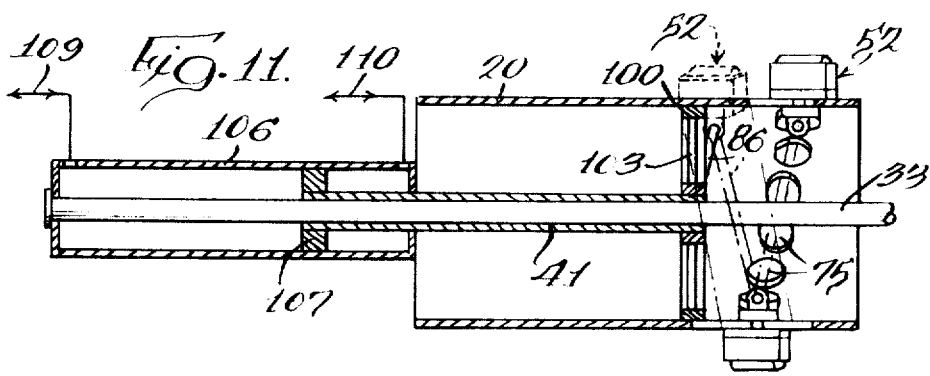
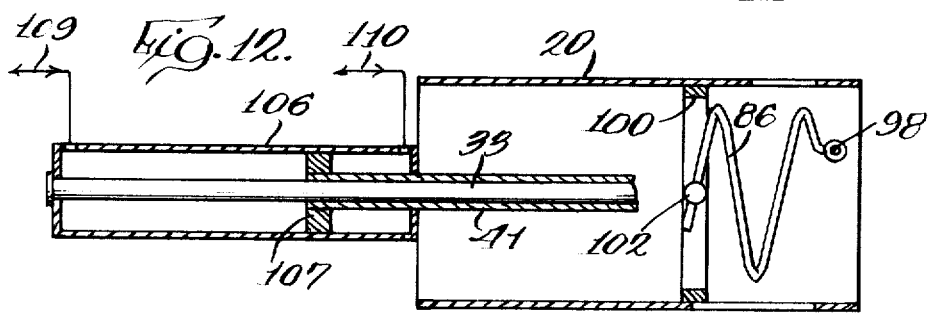

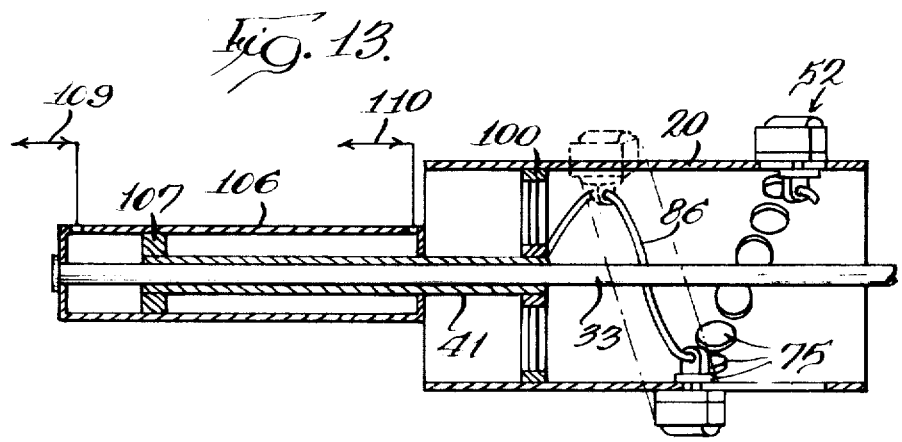
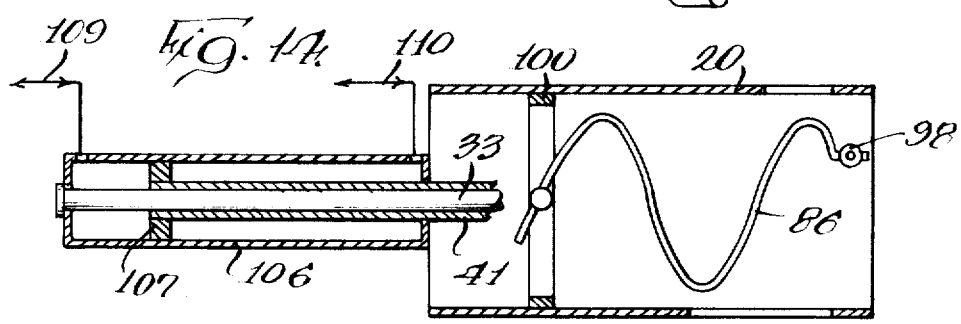
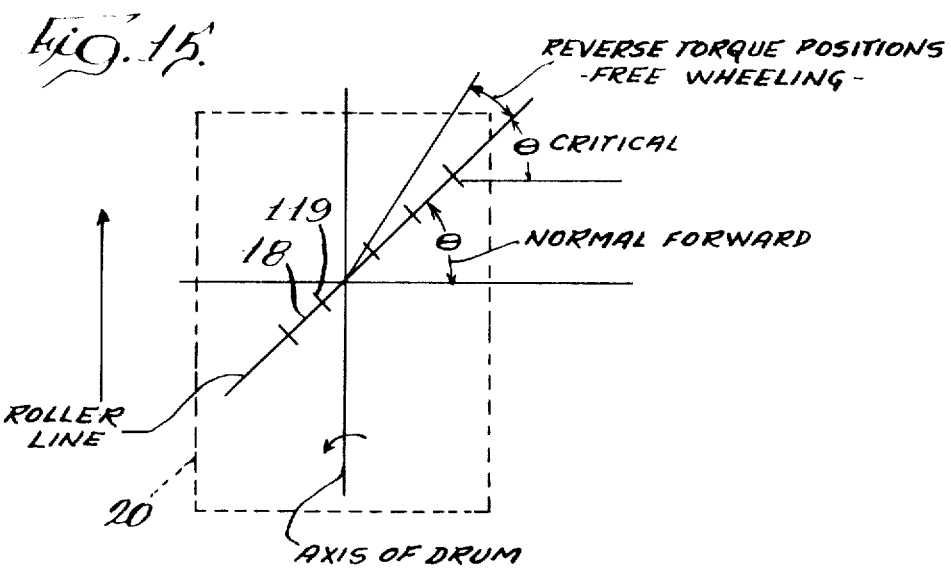

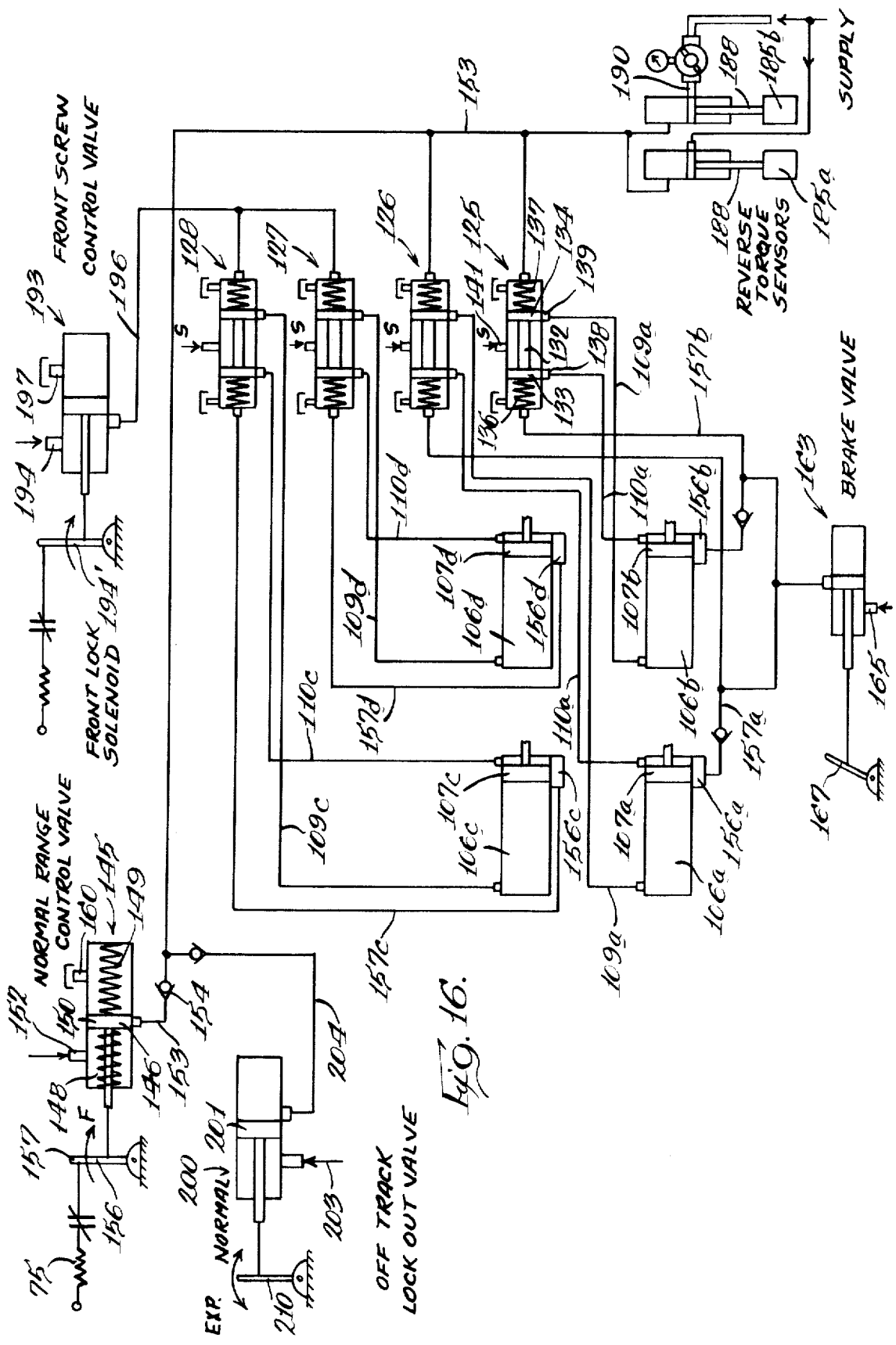

HELICAL DRIVE

BACKGROUND OF THE INVENTION

Various forms of screw-type drives have been employed in the past for propelling vehicles. These propelling devices or wheel substitutes, have limited application in areas of soft ground, mud and even water. They have not found any significant commercial acceptance in on the road or hard surface vehicles for several reasons.

These prior-art devices propel the associated vehicle in the desired direction along the ground or water by forcing the material or liquid rearwardly due to the action of the side surfaces of the screw on the material, thus giving the vehicle forward movement.

This concept is completely unsuitable for on-the-road propelling devices for the obvious reason that damage would be caused either to the screw or by the screw to the hard-surfaced roadway upon which the associated vehicle were driven.

The second basic disadvantage in prior-art screw drives for vehicles is that they are limited in application to slow moving vehicles due to the incapability of a screw drive to transmit torque in both directions. That is, each propelling drivescrew has the capability of transmitting torque from the engine and from the drive train through the propelling screw threads to the ground itself. However, if the vehicle inertia tends to propel the vehicle at a speed greater than that dictated by the engine torque at that time, the screw drive devices will tend to be driven by the ground itself, but due to the helix angle of the screw drive devices they cannot be driven by the ground so that the screw merely slides along the surface of the ground braking the vehicle until the speed of the vehicle is reduced to where the engine torque can again deliver a positive or forward driving force to the propelling screws. Such a construction is obviously undesirable in an on the road vehicle capable of high speeds since the axial sliding of the screw during such a reverse torque condition could cause excessive wear or failure to the screw and damage to the roadway surface.

SUMMARY OF THE PRESENT INVENTION

In accordance with the present invention a screw-type propelling device is provided for high-speed on-the-road-type vehicles, either with or without roadway tracks, having a cylindrical drum with a plurality of individually mounted rollers fixed in a helical path about the periphery of the drum. Two or more of these drum devices may be provided on each vehicle either in the rear of the vehicle or in the front and the rear. Each roller is mounted for rotation about an axis fixed with respect to and perpendicular to the helical path of the rollers. The prime mover associated with the vehicle may be connected to drive either the rear drums or both the front or the rear drums about axes parallel to the intended direction of travel of the vehicle.

With this arrangement, and with the proper selection of the number of rollers to achieve a 360° helix about the drum periphery, each roller will have pure rolling motion on the hard-surfaced conventional roadway without slippage while transferring an axial driving force to the associated drum propelling the vehicle in a forward direction.

A further and important feature of the present invention is its capability of changing drive ratios by varying the helix angle of the line of the rollers about the periphery of the associated drum. As defined herein the helix angle of the rollers is the angle made by the line of rollers with a plane extending transverse to the axis of the associated drum. Provision is made for shifting the rollers to substantially a zero helix angle (suitable only for track operation) to helix angles in excess of what is defined hereinbelow as the critical reverse torque helix angle. A suitable control system is provided for varying the helix angle as desired and thus controlling the speed of the associated vehicle.

Still another feature of the present invention is in the provision of an automatic control for sensing reverse torque on the vehicle, or the propelling helical or screw drive devices, and increasing the helix angle of the roller path to above the critical reverse torque helix angle in response thereto. In accordance with known principles of mechanics the tangent of the helix angle must be greater than the coefficient of friction between the rollers and the roller mounting assemblies to permit reverse torque to be transferred through the helical drive devices back to the engine where the engine effectively brakes the vehicle.

This same principle is utilized in the present device to control vehicle braking and thus the ground-engaging helical rollers act not only as a propelling drive and variable speed transmission, but also as a braking device. When it is desired to brake the vehicle it is only necessary through a suitable transmission ratio control to reduce the helix angle, and assuming that the helix angle is less than the reverse torque helix angle, inherent braking by the screw drive is provided until the vehicle speed is reduced to where it matches the engine torque at the new helix angle of the rollers.

BRIEF DESCRIPTION OF THE DRAWINGS

Other features of the present invention will appear in the following more detailed description thereof, in which:

FIG. 4 is a plan view of one of the rear-driven devices;

FIG. 5 is a cross section taken of one of the roller assemblies shown in FIG. 3;

FIG. 6 is a longitudinal section taken generally along line 6-6 of FIG. 5;

FIG. 7 is a diagrammatic illustration of one of the roller assemblies in its released position;

FIG. 8 is a fragmentary section taken generally along line 8-8 of FIG. 7 showing the serrations for axially locking each roller assembly;

FIG. 9 is a cross section of one of the helical drive assemblies with the rollers in a neutral position;

FIG. 10 is a diagrammatic illustration of the drive assembly shown in FIG. 9 with some parts removed to illustrate the position of the coil guide member;

FIG. 11 is a cross section of the drive assembly shown in FIG. 9 with the rollers positioned in a forwardly driving helix path;

FIG. 12 is a diagrammatic illustration of the drive assembly shown in FIG. 11 with certain parts removed to more clearly illustrate the position of the coil guide member;

FIG. 13 is a cross section of a drive assembly as illustrated in FIG. 9 with the rollers in a reverse torque helical path;

FIG. 14 is a diagrammatic illustration of the drive assembly of FIG. 13 with certain parts removed to more clearly illustrate the position of the coil guide member;

FIG. 15 is a graphic illustration of the helix angles in the present device; and FIG. 16 is a schematic diagram of a hydraulic control circuit for the present vehicle.

DETAILED DESCRIPTION OF THE PREFERRED EMBODIMENT

Figure 1:
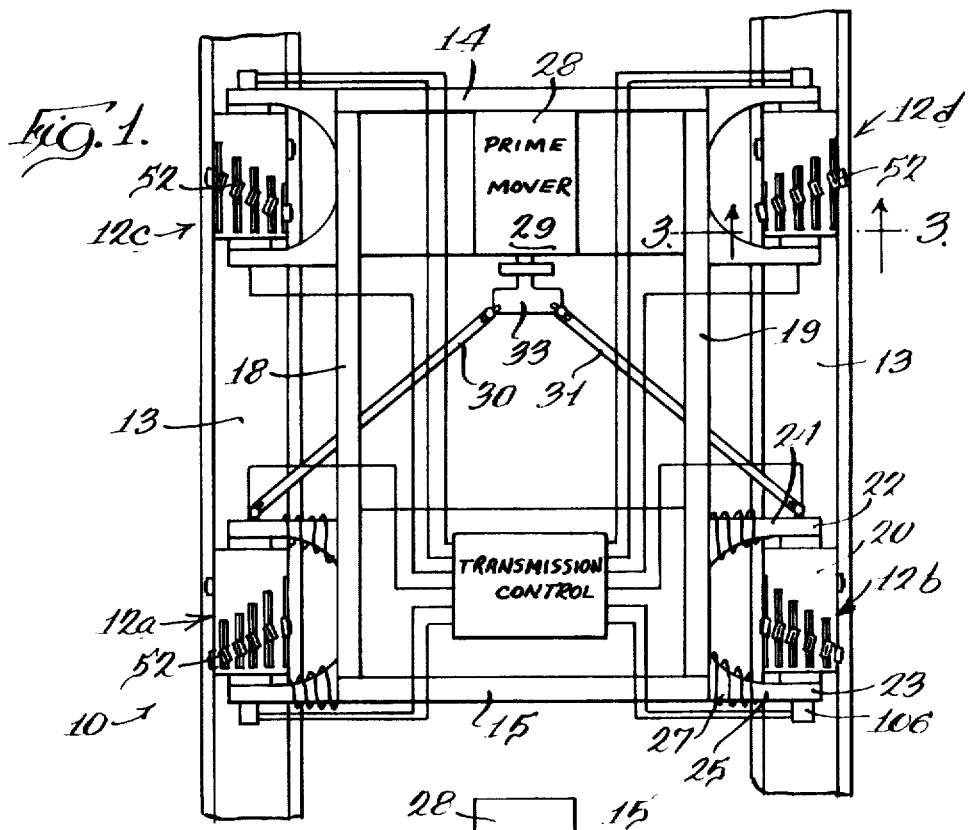
FIG. 1 is a top elevation view of a vehicle according to the present invention.
Figure 2:
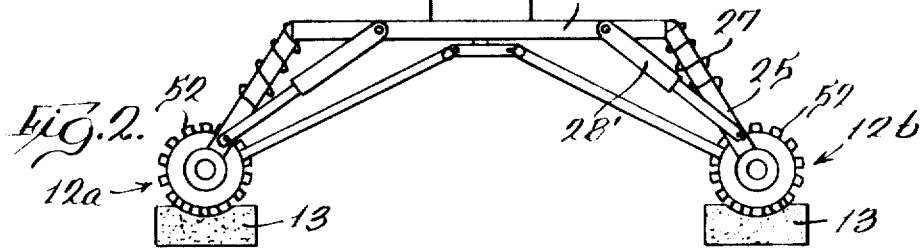
FIG. 2 is an end view of the device shown in FIG. 1 with the tracks illustrated in cross section.

Referring to FIGS. 1 and 2 a vehicle 10 is illustrated driven by helical drive assemblies 12 constructed in a fashion to make the vehicle suitable for high-speed operation on semitoroidal tracks 13, and which vehicle is also suitable for use in conventional hard surfaced local roadways.

The vehicle 10 is seen to include front and rear frame members 14 and 15 with side frame members 18 and 19 fixed to the front and rear frame members. The vehicle 10 employs as wheel substitutes the ground-engaging helical drive devices 12a, 12b, 12c, and 12d. Each of these devices includes a rotary cylindrical drum 20 fixedly mounted for rotation on a shaft rotatably supported in trunnions 22 and 23 having arm members 24 and 25 slidably received in the side frame members 18 and 19. Suitable coil springs 27 and shock absorbers 28' are provided so that the drum members 20 are each individually and resiliently supported on the main vehicular frame. Although not disclosed herein suitable means are provided for steering the vehicle, either by turning the forward drives 12c and 12d, or by differentially rotating the drivescrews on the opposite sides of the vehicle.

The rear helical drive assemblies 12a and 12b are driven by a prime mover 28 through a clutch 29 and universal shafts 30 and 31, respectively. As will appear hereinbelow a reverse-drive gearing 33 may be provided adjacent clutch 29.

As each of the helical drum assemblies 12 are of substantially the same construction the following description will be referenced to only one of these devices with the understanding that it applies equally to the others. Referring to FIGS. 3 to 9 the drum members 20, constructed of a lightweight high-strength magnesium alloy, are each seen to be supported on an axially extending drive shaft 33 by integrally formed radially extending struts 34 which support a central boss 35. The boss 35 is suitably keyed to shaft 33 so that the drum 20 may be driven in rotation by one of the universal drive shafts 30 or 31. The other end of the drum 20 is also supported on shaft 33 by radially extending supports 38 connected to a central boss 39 which supports the drive shaft 33 through an intermediate axially slidable sleeve 41.

Figure 3:
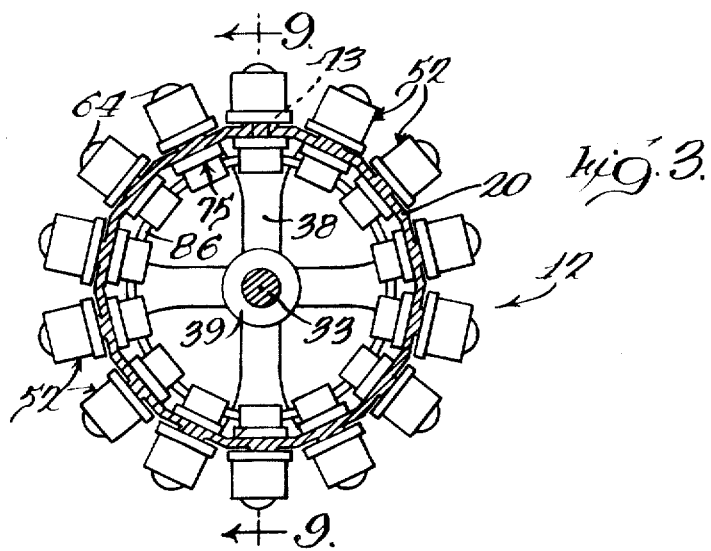
FIG. 3 is a cross section of one of the driven helical propelling devices.

As may be seen only partly in FIGS. 3 and 4 drum 20 has axially extending slots 43, 44, 45, 46, 47 and 48, about the periphery thereof. Additional slots are provided about the unseen side of the drum 20. The slots are spaced equal distances apart completely around the periphery of the drum but each has a different axial length. Slot 43 is the shortest slot and the unseen slot in FIG. 4 on the opposite side of slot 43 from slot 44 is the longest slot. The length of the slots are determined by the maximum desired helix angle of the propelling device. There are 14 slots in the exemplary drum shown but the number may vary as desired.

Mounted independently in each of the slots is a roller assembly 52. With a roller assembly provided in each of the slots the rollers extend 360° about the periphery of the drum regardless of the axial position of the rollers with respect to the drum 20. As will appear more clearly below the variable positioning of the roller assemblies 52 in the slots in the drum 20 permit a variation in the helix angle defined by the line of the roller assemblies 52 about the drum periphery.

The details of the roller assemblies 52 are shown more clearly in FIGS. 4 to 8. Each of these assemblies includes a generally rectangular metal frame member 55 having upturned side portions 56 which fixedly receives a generally rectangular rubber support member 58 having rectangular top and bottom recesses 59 and 60', respectively. Molded within the rubber composition support 58 is a metal frame member 60 having a generally U-shaped portion 62 defining two of the opposed walls in the recess 59.

A roller 64 is seated within recess 59 with its shaft 63 extending through and rotatably supported in the U-shaped frame member 62. Between the ends of the roller and the legs of the frame member portion 62 are heavy duty roller thrust bearings 67 and 68 which serve to transfer the axial thrust from the rollers 64 to the frame 60 and hence to the drum 20 to propel the vehicle. Rollers 64 may be fairly hard rubber.

The recess 60' in the rubber frame 58 provides a limited cushion for the roller 64.

For the purpose of releasably clamping the roller assemblies to the drum 20, the frame 60 is provided with a shank portion 70 which is circular in cross section and extends through the associated axial slot in the drum 20. Carried on the end of shank 70 is an enlarged core portion 72 that without assistance from other elements loosely holds the roller assembly 52 on the drum 29. Core member portion 72 serves as the core of a solenoid 75 having a coil 76 surrounding the core or armature member 72. Carried by one side of the coil 76 is a knurled nonmagnetic plate 78 which is adapted to grip the interior surface 80 of the drum 20 when the solenoid 75 is energized.

Carried by the armature or core 72 is a rectangular elongated guide 82 having a cylindrical bore 83 therein which slidably receives a coil member 86 which serves to position the roller assembly 52 both pivotally about the axis of shank 70 and axially with respect to the slots in the drum 20.

Each of the coils 86 on each propelling device are connected together so that the solenoids 75 are energized or deenergized simultaneously.

As may be viewed more clearly in FIG. 7 resiliently mounted detents 86' and 87 are carried by the underside of frame member 55 and serve to space the frame 55 from the periphery of the drum 20 during the shifting movement of the roller assemblies 52 when a change in drive ratio is desired. The interengagement between the shank 70 and the sides of the axial slots in the drum 20 serve to transfer any transverse load between the drum and the roller assemblies. The knurled plate 78 also assists in this function as well as the coil member 86 as will appear more clearly below.

For assisting in transferring axial forces between the roller assemblies 52 and the drum 20 each of the axial slots in the drum is flanked on both sides by serrated raised ribbon portions 90. As may be seen in the enlarged fragmentary side elevation as shown in FIG. 8 the serrations adjacent the right end of the drum as shown in FIG. 4 are substantially perpendicular to the axis of the drum 20 (zero helix angle) and the angle of the serrations increases moving axially away from the right end of the drum. The rate of increase of the helix angles of the serrations with change in axial position along the associated slot is substantially constant for each slot but this rate decreases as the length of the slot increases.

As also may be seen in FIG. 8 the underside of the roller assembly frame 55 has spaced parallel serrated ribbons 93 complementing the serrations 90. That is, the left serration 94 is perpendicular to the axis of roller 64 but the serrations increase in angularity over the axial length of the roller assembly to the same extent as do the serrations 90 for the same axial length for each slot and roller assembly. Note that the serrations 90 and 94 are enlarged in FIG. 8 for clarity.

Thus, regardless of the axial position of the roller assemblies 52 with respect to the associated slots the serrations 90 will congruently mate with the serrations 94 in the roller frames 55. The angles on the serrations are selected so that when the rollers are positioned adjacent the left end of the slots in the drum 20 as seen in FIG. 3 the rollers will have their axes substantially parallel with the axis of drum 20 and as the rollers are shifted axially from this position they will, when clamped to the drum 20, assume pivoted positions such that the axes of the rollers 64 are always maintained perpendicular to the helical path of all of the roller assemblies 52, thereby assuring pure rolling motion of the rollers 64 on the roadway surface.

Referring again to FIGS. 6 and 7 when it is desired to shift the rollers 52 the solenoids 75 are deenergized permitting the detents 86' and 87 to lift the frame member 55 sufficiently away from the drum to permit complete disengagement between the serrations 90 and 94. As will be described below, the coil member 86 then shifts the coil assemblies 52 axially in the associated slots and at the same time pivots the roller assemblies about the axes of shanks 70 to the proper position. The angles of the serrations 90 are matched with the helix angles of the coil 86. When the roller assemblies have been shifted to the desired point, the solenoids 75 are energized pulling shanks 70 downwardly engaging serrations 90 and 94 and forcing the knurled plates 78 upwardly against the inner surface 80 of the drum 20 firmly locking the roller assemblies 52 in position against radial, axial and rotative movement.

The serrations 90 and 94 serve the additional function of temporarily locking the roller assembly 52 against axial movement even when the associated solenoid 75 is deenergized when the roller 64 engages the roadway. That is, the force of the roadway overcomes the opposing force of the detents 86' and 87 and momentarily locks the roller assemblies against the drum. It should be understood that there are approximately 10 to 14 rollers about the periphery of the drum 20 so that only two or three rollers engage a flat roadway at any instant during rotation of the drum 20. Thus, the serrations transfer the axial forces, and sometimes a portion of the radial forces, from the roller assemblies 52 to the drum 20 during shifting from one transmission ratio to another when solenoids 75 are deenergized. In some cases it may be desirable for this load to be carried by the coil member 86 itself although, of course, this would require an appropriately heavier coil.

For the purpose of shifting the roller assemblies 52 in their associated slots into the desired helical path and for pivoting them to the appropriate helix angle the coil member 86 is provided expansibly mounted within the drum 20. One end of the coil member 86 is pivotally mounted about a radial axis with respect to the drum 20 in a boss 98 fixed to the inner surface 80 as may be seen in FIGS. 9 and 10. While the roller assemblies extend peripherally only 360° (one revolution) about the surface of drum 20, the coil member 86 extends a greater angular distance since the angular length of the coil member 86 decreases somewhat as the helix angle of the coil member is increased. As may be viewed in FIGS. 9, 11 and 13, the coil member 86 may be thought of as threaded through the guide bores 83 of the roller assemblies 52. Since a coil such as coil member 86 changes diameter somewhat upon extension and distension it is necessary to provide compatible strength of the detents 86' and 87, or alternatively to provide sufficient play between the coil member 86 and the guide bores 83 to prevent the coil member 86 from causing engagement between the serrations 90 and 94 during extension of the coil member 86. There are, of course, other obvious ways of compensating for the change in diameter of coil member 86.

For the purpose of supporting the other end of the coil member 86 and for axially extending the coil member a sleeve 100 is provided closely fitted but slidable within the drum 20. Carried by the sleeve 100 is a pivotal boss 102 which slidably receives and supports the other end of the coil member 86. The sleeve 100 serves the additional function of supporting the drum 20 which is weakened somewhat by the slots 43, etc.

For the purpose of axially shifting the sleeve 100 it had radial struts 103 supporting an annular bearing support 104 surrounding the shaft 33 and receiving a suitable flange (not shown) on the end of sleeve 41 so that the sleeve 41 can rotate with respect to the boss 104 but is not permitted any axial movement with respect thereto. Thus, the axial shifting movement of sleeve 41 will cause the axial shifting movement of the sleeve 100 and the extension and distension of the spring 86. A hydraulic servomotor 106 is provided for shifting the sleeve 41 and is supported in frame trunnion member 23 as shown in FIG. 1. The sleeve 41 is connected to a piston 107 slidable in hydraulic cylinder 106. The piston is shiftable by porting fluid selectively in either direction through hydraulic lines 109 and 110 connected to opposite ends of the cylinder 106.

As shown in FIG. 9 the propelling device 12 is in its neutral position where the rollers 52 have assumed a substantially zero helix angle. The position of the coil member 86 as shown in FIG. 10 is also in the "neutral" position even though there is a small helix angle on the coil member 86. This small helix angle is necessary to avoid interference between the portions of the coil member 86 that extend more than 360° with the sides of the guide-receiving members or portions 82 of the roller assemblies. However, this small helix on the coil member 86 can be compensated for by a small amount of play in the bores 83 and the appropriate positioning of the serrations 90. Obviously, other means may be provided for effecting a zero helix angle roller path.

As the piston 107 is driven to the left by the supply of hydraulic fluid to line 110 and the exhaust of fluid from line 109 the sleeve member 100 will move to the left extending the coil member 86. Before this is done, however, it is necessary that the solenoids 75 be deenergized to release the clamping action on the roller assemblies 52. As the coil member 86 expands under movement of the sleeve to the left the engagement thereof with the guide slots 83 in the roller assemblies causes the axial shifting of the roller assemblies in the associated slots and the pivotal movement thereof to increasingly greater helix angles and the piston 107 may be stopped in any desired position to achieve substantially any desired helix angle and thus any mechanical advantage or drive ratio desired. In FIGS. 11 and 12 an exemplary forward torque helix angle is shown. When the paths of the rollers achieves the desired helix angle the piston 107 is stopped by a suitable control and the solenoids 75 are energized clamping the rollers 52 rigidly to the drum 20. Since the helix angles of the serrations 90 are matched with helix angle of the coil member 86 at each position the roller assemblies are pivoted sufficiently by the coil member 86 so that the serrations 94 will be substantially aligned with serrations 90 prior to clamping.

For the purpose of providing electric current to the solenoids 75 a suitable slip ring assembly 115 is provided supported by the forward trunnion 22 as shown in FIG. 9.

As described above there are conditions under which it is desirable to permit the helical propelling members 12 to be driven by the ground-engaging surface rather than the prime mover. This condition is referred to herein as reverse torque and it is a condition that the front propelling devices are under continuously since they are not driven by the prime mover. However, it would be possible to drive the forward wheels in the same manner as the rear wheels of the present device with suitable modifications in the drive and the control circuitry described below.

For the purpose of explaining this reverse torque feature of the present device it might be helpful to briefly review the geometry of the present device as shown in FIG. 15.

The dotted rectangular line indicates the drum 20 and the arrow indicates that the drum is rotating in a counterclockwise direction when viewed axially toward the direction of travel. Line 118 indicates the roller path about the periphery and lines 119 represent the axes of the individual rollers 64, which axes are always perpendicular in the present device to the roller line 118. The angle $\theta$ is the angle that the roller line defines with a plane transverse to the axis of the shaft 33 and this angle is referred to herein as the helix angle. There is a helix angle $\theta_c$ indicated in FIG. 15 below which the vehicle may be propelled by forward torque delivered from the engine to the propelling device 12. This will be true of any helix angle less than $\theta_c$. However, for helix angles of the roller line less than $\theta_c$ the propelling device 12 will have an inherent braking characteristic that is controlled and used advantageously in the present device. For example, if the helical drive ratio is set by a helix angle of less than $\theta_c$ and the operator desires vehicular braking it is only necessary that he reduce the helix angle by shifting the piston 107 to the right distending the coil member 86. This will effect vehicular braking by the propelling devices 12 themselves and not by the vehicular engine. The vehicle will then slow down until the inertia of the vehicle produces a force less than the torque provided by the engine to the propelling devices 12 at which time the torque will reverse on the propelling devices and they will again begin driving the vehicle.

It is sometimes desirable for the propelling devices 12 to freely transmit, or controllably transmit reverse torque from the rollers 64 to the engine so that vehicular braking is effected by the engine rather than by the propelling devices 12. For this purpose the coil member 86 is shiftable to a position shown in FIGS. 13 and 14 where the helix angle $\theta$ of the roller line is greater than $\theta_c$ shown in FIG. 15. In accordance with known principles of mechanics $\theta_c$ is defined as that angle where $\tan \theta$ equals the coefficient of friction $f$ between the helix (the rollers 64) and the inclined surface against which the helix acts (the roller thrust bearings 67 and 68). Thus, when the roller line is shifted to a helix angle greater than $\theta_c$ the inertia of the vehicle combined with the friction of the roadway will cause the rotation of the drum 20 (or the transfer of rotational torque thereto about the axis of shaft 33) tending to drive the engine in a reverse direction so that the engine effectively brakes the vehicle. In the present exemplary embodiment the forward propelling devices 12c and 12d are normally maintained at helix angles in excess of $\theta_c$ since they are driven by ground engagement rather than by the prime mover. A reverse torque condition on the rear driving wheels can result from a plurality of causes such as when the vehicle begins movement down an incline or if the operator decreases the throttle setting of the prime mover associated with the vehicle.

There is provided in the present device a reverse-torque-sensing device for the rear propelling devices 12a and 12b which automatically increases their helix angles above $\theta_c$ to permit the free transmittal of torque to the propelling devices. This not only eliminates undesired loads on the thrust bearings 67 and 68 but also permits controlled braking by decreasing the helix angle of the roller line from this reverse torque position roller line. This is effected merely by reducing the helix angle of the roller line back to or slightly below $\theta_c$. Reference will now be made to FIG. 16 wherein a schematic control circuit is provided for the propelling devices 12. In FIG. 16 the helix control motors 106 and their associated pistons 107 are referenced a, b, c and d indicating left rear, right rear, left front, right front, respectively. Control valves 125, 126, 127 and 128 are provided for controlling cylinders 106a, 106b, 106d, 106c, respectively.

Each of the control valves 125 to 128 includes a movable valve member 132 having spaced lands 133 and 134 interconnected by a reduced stem portion. The valve member 132 is balanced to a neutral position by springs 136 and 137 where the lands 133 and 134 block ports 138 and 139, respectively, communicating with passages 110a and 109a, respectively. Port 141 communicates with a suitable source of supply fluid.

For the purpose of normally positioning the roller line at any desired helix angle a normal control valve 145 is provided including a movable valve member 146 biased to its neutral position shown by springs 148 and 149. Valve outlet passage 153 supplied fluid across check valve 154 to the right ends of the rear device valves 125 and 126. It should be noted that the valve member 146 is positioned by a manually operable handle 156 which carries a manually operable normally closed switch 157 for energizing all of the rear solenoid coils in propelling devices 12a and 12b. It should be noted that the land 150 is positioned in its neutral position such that there is a slight supply flow to line 153 to make up any leakage in the circuit. When the operator desires to increase the mechanical advantage of the drive train he need merely rotate pivot handle 156 clockwise shifting land 150 to the right porting fluid through line 153 to the right ends of valves 125 and 126 shifting the associated valve members 132 to the left porting supply fluid from supply lines 141 to lines 110a and 110b respectively, driving the associated pistons 107a and 107b to the left increasing the roller line helix angles of propelling devices 12a and 12b respectively.

A fluid feedback valve 156a, 156b, 156c and 156d is provided for each cylinder 106. This valve is of well-known construction and provides a fluid signal having a pressure proportional to the axial position of piston 107 in the cylinder. Thus, as the pistons 107a and 107b move to the left the feedback valves 156a and 156b provide increasing pressure signals through lines 157a and 157b to the left sides of valves 125 and 126 in conventional feedback fashion tending to shift the valve members back to their neutral position shown in the drawing blocking ports 138 and 139. When the pistons 107a and 107b reach a position proportional to the extent of movement of valve member 145 the valves 125 and 126 will block flow relative to the cylinders 106a and 106b stopping movement of the associated coil members 86. Switch 157 may then be released locking the roller assemblies of devices 12a and 12b to their associated drums.

By the suitable control of the operating handle 156 any desired transmission ratio may be selected by varying the helix angle of the roller line. The vehicle may be braked at any time by shifting the valve member 145 so that land 150 provides communication between line 153 and tank 160.

However, a more regulated and controlled acting braking may be effected by the braking valve 163 which selectively communicates the feedback lines 157a and 157b with a regulated supply 165 which is regulated at a pressure in excess of the maximum feedback pressure provided by feedback valves 156. Valve 165 tends to increase the pressure on the left end of the valves 125 and 126 porting fluid through ports 139 to lines 109a and 110a shifting their respective pistons 107a and 107b to the right reducing the helix angle and increasing the braking effect of the propelling devices 12a and 12b in a manner controlled by the extent of depression of brake pedal 167.

For the purpose of sensing reverse torque, pressure-responsive devices 185a and 185b are provided located between the hydraulic cylinders 106 and the bearing bosses 39. These devices are of conventional construction and serve to sense by the axial compression between boss 39 and the end of the hydraulic ram 106 the axial reverse torque acting on the associated drum 20. These sensing devices when activated by a reverse torque on the associated drum shift their associated valves 188 supplying fluid from a regulated supply 190 to the main control line 153 to increase the pressure acting on the right side of valves 125 and 126 shifting them to the left and porting fluid to passages 109a and 110a thereby increasing the helix angle of the propelling devices 12a and 12b. The supply 190 is regulated to a pressure sufficient to match the feedback pressure from valves 156a and 156b at a predetermined roller line helix angle in excess of $\theta_c$ (the reverse torque helix angle discussed above).

A forward propelling device control valve 193 is provided which communicates the right side of valves 127 and 128 with a supply conduit 194 which supplied fluid under sufficient pressure to valves 127 and 128 to maintain the forward drive members 12c and 12d at helix angles above $\theta_c$ so that they are normally in their reverse torque positions as described above. Control handle 194' permits line 196 to be selectively communicated with a tank 197 to vary the front helix angle if desired. However, normally free communication would be provided between supply port 194 and line 196 to maintain the forward drive members at their high helix angle (reverse torque portions).

As discussed above the present vehicle is adapted for use both in suitable semitoroidal tracks and also on conventional roadways. With the present control system it is possible to move the roller line to zero helix angle and in case the rear devices 12a and 12b are in this position and if the vehicle is at rest under such conditions even with the main clutch engaged, the vehicle will not be propelled forward with the engine running since the drive devices 12a and 12b will merely rotate about the axes of shafts 33 with no forward or reverse motion. This is of some advantage in a tracked vehicle since since it permits the governor control of engine speed with vehicular speed being controlled solely by control over the transmission without the requirement for a manually operable throttle control or speed control for the prime mover. The advantages of such a control will be apparent to those skilled in the art.

On the other hand, the capability of the driving devices of assuming a neutral position (note that this position can only accurately be termed a neutral position when the vehicle is at rest since if the vehicle is moving and the rollers move to a zero helix angle they will act as a brake on the vehicle) is a disadvantage under normal conditions during trackless operation since it would create a lateral instability of the vehicle if the roller line were placed in a zero helix angle.

Therefore, means are provided for preventing the roller lines from assuming a zero helix angle when the vehicle is operating on conventional trackless roadways.

Toward this end a normal roadway valve 200 is provided with a shiftable valve member 201 having a land which blocks a supply port 203 from a feedline 204 when in the tracking position shown. In this position the valve has no affect on the normal control valve 145 which is capable if desired of placing the rollers in the zero helix angle position. When conventional roadway driving is desired the operator shifts valve member 201 to the right by handle 210 providing communication between a regulated supply 203 and feedline 204 which communicates with the main helix angle control line 153 down stream of the check valve 154. This maintains a minimum pressure in control line 153 sufficient to prevent the helix angle of the roller line from decreasing to the point where any lateral instability of the vehicle is created.

It should be understood that while reverse gearing is provided by gearing 33 in the present vehicle, various other means may be added for this purpose. For example, the helix angle of the roller line may be brought to neutral and reversed to reverse the direction of the associated vehicle. It is, of course, necessary to provide some means for blocking the reverse torque valves 188 during reverse drive.

If rigid geometrics be assumed, then the effective diameter of the helical device would vary as ground engagement transfers from one roller assembly to the next. However, the resiliency of rubber support 58 provides a smooth vibrationless transfer of load from one roller assembly 52 to another. Another approach to reducing this vibration tendency is to increase the axial length of each roller assembly.

I claim:

1. A propelling device comprising: frame means, a drive member carried by the frame means and rotatable about an axis generally parallel with the direction of travel of the frame means, a plurality of individually rotatable members mounted on said drive member, the axes of rotation of said individually rotatable members being constrained to positions related angularly other than 90° to the drive member axis, the angular relationship between the axis of each of the rotatable members with the axis of the drive member being substantially equal.

2. A propelling device as defined in claim 1, wherein said individually rotatable members are rollers.

3. A propelling device as defined in claim 1, wherein said drive member is a cylindrical drum, a drive shaft extending through said drum and drivingly fixed thereto, each of said individually rotatable members including a roller assembly, said assembly including a resilient support fixed to said drum, a recess in said support, a roller having a coefficient of friction approximating that of rubber rotatably mounted in said recess, and thrust bearings between the ends of the rollers and the recess.

4. A propelling device comprising, frame means, a drive member carried by the frame means and rotatable about an axis generally parallel with the direction of travel of the frame means surface-engaging means releasably fixed to said drive member to move in a path angularly related to said axis, and control means for shifting said surface-engaging means to different positions defining different angular relationships between the paths and the axis.

5. A propelling device as defined in claim 4, wherein said surface engaging means includes means for preventing significant sliding movement with respect to said surface.

6. A propelling device as defined in claim 5, wherein said surface-engaging means includes a plurality of friction rollers mounted for rotation about an axis generally transverse to a helical path.

7. A propelling device as defined in claim 6, wherein said control means increases the helix angle of said rollers by shifting each roller axially with respect to said rotatable drive member and pivoting each roller about an axis substantially perpendicular to the roller axis and lying in a radial plane of the rotatable drive member.

8. A propelling device as defined in claim 7, wherein said control means maintains each of the rollers at equal helix angles with respect to the axis of the drive member in any adjusted position thereof and makes equal changes in the helix angles of the rollers, said control means effecting an incrementally greater axial shifting movement of each roller with respect to one of its adjacent rollers for a given change in helix angle to thereby maintain the axes of the rollers substantially transverse to the helix path regardless of helix angle to assure substantially rolling motion of said rollers.

9. A propelling device as defined in claim 7, wherein said control means includes an axially expansible coil member, said rollers being part of a plurality of roller assemblies, each of said assemblies being slidably received on said coil member.

10. A propelling device as defined in claim 9, including means connecting one end of said coil member to said rotatable drive member, axially shiftable sleeve means connected to the other end of said coil member for axially expanding the same, said roller assemblies having guide surfaces engaging said coil member so that each assembly assumes the same helix angle and the roller assemblies lie in substantially the same helical path.

11. A propelling device as defined in claim 4, wherein said surface-engaging means includes a plurality of surface-engaging members, means for releasably clamping said surface-engaging members to said drive member, said control means shifting said surface-engaging members when said surface-engaging members are released from said drive member.

12. A vehicular propelling device as defined in claim 4, wherein said surface-engaging means is movable to a path with a substantially zero helix angle providing a neutral drive.

13. A propelling device comprising: frame means, a drive member carried by said frame means and rotatable about an axis generally parallel with the direction of travel of the frame means, and surface-engaging means including means on said member movable relative to said member constrained for movement only in a path related to said axis at an angle other than 90°.

14. A propelling device as defined in claim 13, wherein surface-engaging means includes a plurality of roller assemblies, means for shifting said roller assemblies including means for maintaining the roller assemblies in a generally helical path about said drum member.

15. A propelling device as defined in claim 14, wherein said roller assemblies are received in a plurality of slots in said drum member.

16. A propelling device as defined in claim 14, including interengaging means on said roller assemblies and said drum member for maintaining said assemblies in a predetermined rotational position about an axis extending through the drive member axis and substantially perpendicular to and intersecting said roller axis as a function of the axial position of the roller assemblies with respect to the drum member.

17. A propelling device as defined in claim 16, wherein said interengaging means includes a plurality of serrations on said drum member having increasing helix angles extending away from one end of the drum member.

18. A propelling device as defined in claim 14, wherein said means for shifting the roller assemblies includes a coil member, and means for axially extending and distending said coil member.

19. A propelling device, comprising: a drive member rotatable about an axis generally parallel with the direction of movement of the member, a plurality of surface-engaging means mounted on said member, said surface-engaging means each being constrained for movement relative to said member when in engagement with said surface in a path related angularly other than 90° to said axis.